United States Patent
Chen et al.

(10) Patent No.: US 7,226,798 B2
(45) Date of Patent: Jun. 5, 2007

(54) FABRICATION METHOD FOR A MULTI-LAYERED THIN FILM PROTECTIVE LAYER

(75) Inventors: Wei-Shiau Chen, Chin-Men Hsien (TW); Kao-Su Huang, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 244 days.

(21) Appl. No.: 10/794,528

(22) Filed: Mar. 5, 2004

(65) Prior Publication Data
US 2005/0054129 A1 Mar. 10, 2005

Related U.S. Application Data

(63) Continuation-in-part of application No. 09/479,483, filed on Jan. 10, 2000, now abandoned.

(30) Foreign Application Priority Data
Jul. 19, 1999 (TW) ............................. 88112203 A

(51) Int. Cl.
*H01L 21/311* (2006.01)
*H01L 21/56* (2006.01)
(52) U.S. Cl. ..................... 438/26; 438/30; 438/38; 438/118; 438/763; 349/155
(58) Field of Classification Search ................ 438/26, 438/30, 38; 349/155, 156, 157
See application file for complete search history.

(56) References Cited

U.S. PATENT DOCUMENTS

| | | | | |
|---|---|---|---|---|
| 5,739,890 A * | 4/1998 | Uda et al. | .................... | 349/156 |
| 6,016,181 A * | 1/2000 | Shimada | ..................... | 349/156 |
| 6,181,406 B1* | 1/2001 | Morimoto et al. | .......... | 349/155 |
| 6,266,121 B1* | 7/2001 | Shigeta et al. | .............. | 349/156 |
| 6,570,639 B1* | 5/2003 | Manabe et al. | ............. | 349/190 |
| 6,674,500 B2* | 1/2004 | Manabe et al. | ............. | 349/110 |
| 6,747,289 B2* | 6/2004 | Yamazaki et al. | ............ | 257/59 |
| 6,812,977 B1* | 11/2004 | Iwamatsu et al. | ............. | 349/73 |
| 6,900,084 B1* | 5/2005 | Yamazaki | ................... | 438/158 |
| 2001/0041392 A1* | 11/2001 | Suzawa et al. | ............ | 438/149 |
| 2003/0180996 A1* | 9/2003 | Yamazaki et al. | .......... | 438/200 |

* cited by examiner

*Primary Examiner*—George Fourson
(74) *Attorney, Agent, or Firm*—J.C. Patents

(57) ABSTRACT

A fabrication method for a multi-layered thin film protective layer, which is applicable on a substrate having a peripheral circuit area and a pixel cell area, is described. Metal layers and pixel cells are formed on the peripheral circuit area and the pixel cell area, respectively. A first oxide layer, a silicon nitride layer and a second oxide layer are sequentially formed on the pixel cells and the metal layers. The second oxide layer is then patterned to define a pre-determined position of a pad spacer in the pixel cell area and the peripheral circuit area. The silicon nitride layer and the first oxide layer are further defined to form a first protective layer in the peripheral circuit area and to from a pad spacer in the pixel cell area exposing the pixel cells. A second protective layer is then formed on the exposed pixel cells.

20 Claims, 5 Drawing Sheets

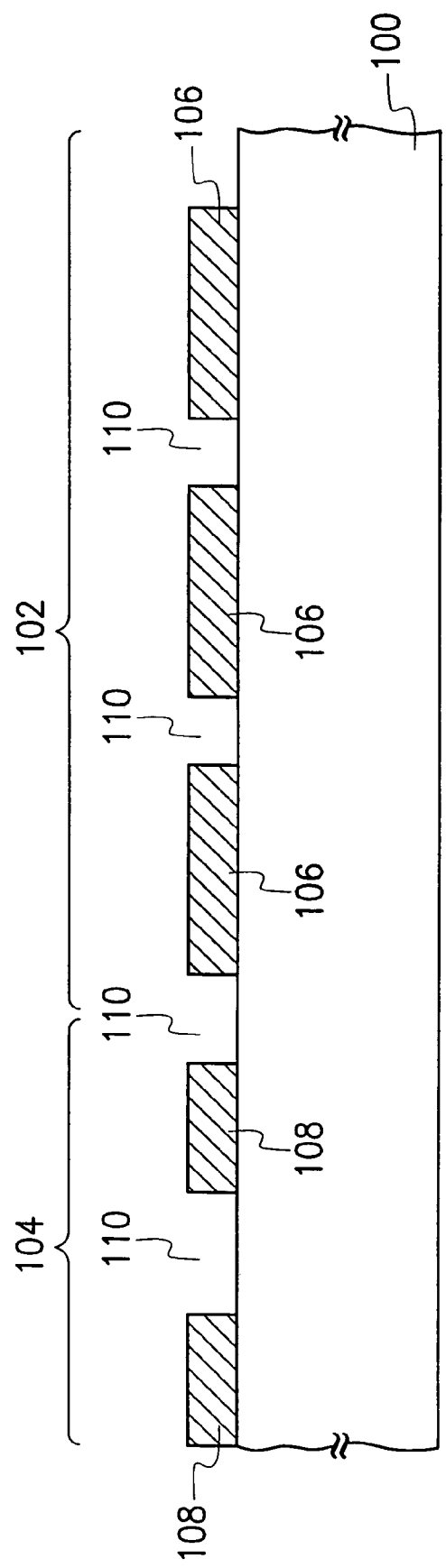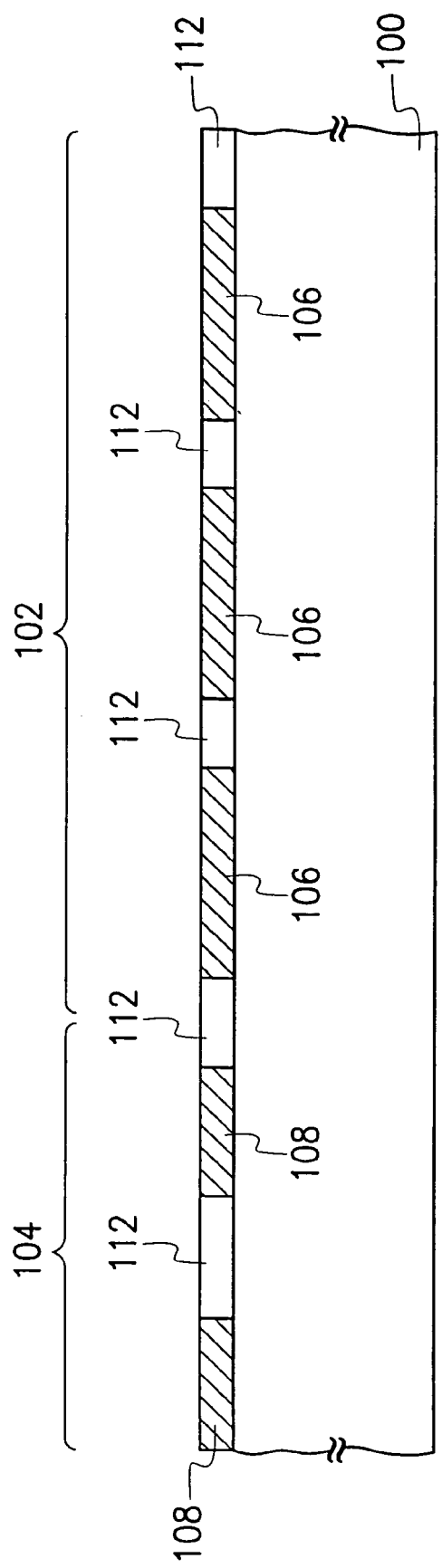

FABRICATION METHOD FOR A MULTI-LAYERED THIN FILM PROTECTIVE LAYER

CROSS-REFERENCE TO RELATED APPLICATION

This application is a continuation-in-part application of a U.S. application Ser. No. 09/479,483, filed on Jan. 10, 2000 now abandoned, which claims the priority benefit of a Taiwan application serial no. 88112203, filed Jul. 19, 1999.

BACKGROUND OF THE INVENTION

1. Field of the Invention

This invention relates to a fabrication method for a protective layer. More particularly, the invention relates to a fabrication method for a multi-layered thin film protective layer of a reflective micro liquid crystal display (μ-LCD) device.

2. Description of the Related Art

The operation of a reflective micro-LCD device is based on an application of a voltage to a metal layer on the surface of a control circuit. An electric field is generated to control the orientation of the liquid crystal. As light transmits through the liquid crystal and arrives to the metal layer, the metal layer reflects the light, which in turn transmits through the liquid crystal. The different orientations of the liquid crystal display different optical properties, thereby displaying different images.

During the packaging of the reflective μ-LCD device, the filling of the liquid crystal requires coating a spacer between the glass plate and the device wafer to separate the glass plate and the device wafer. In addition, a protective layer is formed on the metal layer of the device wafer surface to protect the underlying devices.

The spacer, however, can only be coated on the periphery of the device wafer. The glass plate supported by the spacer thereby bends easily at the center due to stress. As a result, while filling the liquid crystal, the thickness of the liquid crystal cannot be uniform, and a Newton's ring is resulted. The non-uniform thickness of the liquid crystal seriously affects the quality of the display. Not only the displaying color is changed, the differentiation between the shades of color is also reduced.

Further, the metal layer of the device wafer requires a protective layer to prevent the metal surface from moisture penetration and from being scratched. The structure and the thickness of the protective layer directly affect the reflection property of the metal layer. The fabrication of the protective layer is, therefore, a very critical step in the manufacturing of a reflective micro-LCD device.

SUMMARY OF THE INVENTION

In the light of the forgoing, the present invention provides a method for fabricating protective layers of various structures on a substrate of a reflective μ-LCD device, wherein the various combination of the protective layers of the various structure can accommodate the different types of protection for the different device areas.

In addition, the present invention provides a method for fabricating a protective layer structure as a spacer in the device region to support the glass plate and the device wafer and to improve the Newton's ring effect.

The present invention further provides a fabrication method for a multi-layered thin film protective layer, which is applicable to a substrate comprising a peripheral circuit area and a pixel cell area. Metal layers and pixel cells are formed in the peripheral circuit area and the pixel cell area, respectively, and the metal layers and the pixel cell layers are separated by an insulation material. Thereafter, a first oxide layer, a silicon nitride layer and a second oxide layer are sequentially formed on the pixel cells and the metal layer. The second oxide layer is further patterned to define the predetermined positions of the pad spacers in the pixel cell area and the peripheral circuit area. The silicon nitride layer and the first oxide layer are further defined to form a first protective layer in the peripheral circuit area and to form a pad spacer in the pixel cell area, exposing the pixel cells. After this, a second protective layer is formed on the exposed pixel cells. The pad spacer is formed with a first oxide layer, a silicon nitride layer and a second oxide layer. The first protective layer is formed with the silicon nitride layer and the first oxide layer. The second protective layer is a thin oxide layer.

The present invention can accommodate the needs of having different protective layers for the different device areas. A protective layer, which can prevent moisture penetration and scratch, is formed to protect the device from being damaged. In the area that requires a high reflectivity, a protective layer with a high transmittance to light is formed to fulfill the product requirement. In addition, pad spacers are formed on the device wafer, wherein the pad spacer is higher than the protective layer to facilitate the filling of liquid crystal and to lower the stress generated in packaging, thereby preventing the occurrence of the Newton's ring effect. The thickness of the liquid crystal is therefore more uniform, and the resulting liquid crystal device has a better capability of differentiating the various shades of color.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIGS. 1A to 1F are schematic, cross-sectional views showing the fabrication of the multi-layered protective layer for a reflective micro-LCD device.

DESCRIPTION OF THE PREFERRED EMBODIMENT

The functions of the different device areas of a reflective micro-LCD are different, thereby mandating different protective layer structures. The conventional protective layer structure of a silicon nitride layer/silicon oxide layer prevents the device from being scratched and from moisture penetration. However, the transparency of the silicon nitride/silicon oxide layer as the protective layer for the pixel cell area of a reflective μ-LCD device, however, is not acceptable. In other words, the formation of a silicon nitride/silicon oxide layer in the pixel cell area affects the reflectivity of the pixel cells. The peripheral circuit area of a reflective μ-LCD device, on the other hand, still needs to be protected from scratch and moisture penetration. The formation of a protective layer with better transparency, although able to accommodate the needs of the pixel cell area, cannot prevent the peripheral circuit area form being scratched and moisture penetration.

According to an embodiment of the present invention, a fabrication for a multi-layered thin film protective layer structure on a device wafer of the reflective micro-LCD device is provided. A silicon nitride/silicon oxide protective layer is formed in the region that mandates the protection from moisture penetration and scratched, while only a thin oxide layer is formed in the area that requires a higher reflectivity. In another words, different protective layer structures are formed according to the functions of the different device areas. Furthermore, during the formation of the above protective layers, pad spacers are formed and scattered in the device wafer to support the glass plate and the device wafer and to prevent the generation of the stress during the packaging process.

Figure 1C:
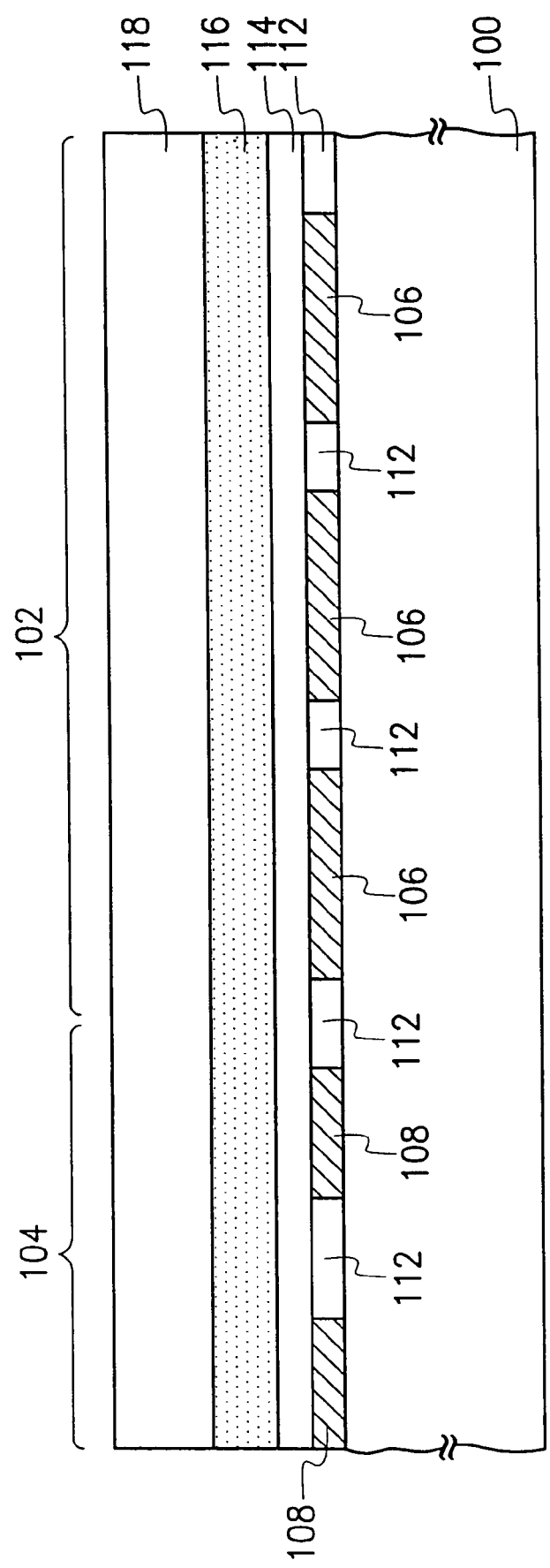

FIGS. 1A to 1F are schematic, cross-sectional views showing the fabrication of multi-layered protective layer for a reflective micro-LCD device. Referring to FIG. 1A, a substrate 100 of a reflective micro-LCD device comprises a pixel cell area 102 and a peripheral circuit area 104. The pixel cells 106 in pixel cell area 102 are formed with a metal material, and are served to connect the circuitry from the substrate 100. The metal layers 108 in the peripheral circuit area 104 are also for connecting the circuitry from the substrate 100. The pixel cells 106 and the metal layers 108 are separated by the mirror layer gaps 110.

The mirror layer gaps 110 are then filled with an insulation layer 112 as illustrated in FIG. 1B. The insulation layer 112 is deposited on the pixel cells 106 and on the metal layers 108. The insulation layer 112, for example, an oxide layer formed by high density plasma chemical vapor deposition (HDPCVD), fills the mirror layer gaps 110 and covers the metal layers 108 and the pixel cells 106. The insulation layer 112 is then planarized by chemical mechanical polishing and is etched back to expose the pixel cells 106 and the metal layers 108. The insulation layer 112 that fills the mirror layer gaps 110 separates the pixel cells 106 from the metal layers 108.

Thereafter, the fabrication of the protective layer is conducted as shown in FIG. 1C, in which a layer of an oxide material 114 is formed on the pixel cell area 102 and the peripheral circuit area 104, covering the pixel cells 106 and the metal layers 108. The oxide layer 114 is deposited by, for example, chemical vapor deposition, to a thickness of approximately 1000 Å. A silicon nitride layer 116 is further formed on the oxide layer 114, followed by forming another oxide layer 118. The silicon nitride layer 116, formed by, for example, chemical vapor deposition, is approximately 4200 Å thick, and the oxide layer 118 is approximately 10000 Å thick with an error of about 10%.

Figure 1D:
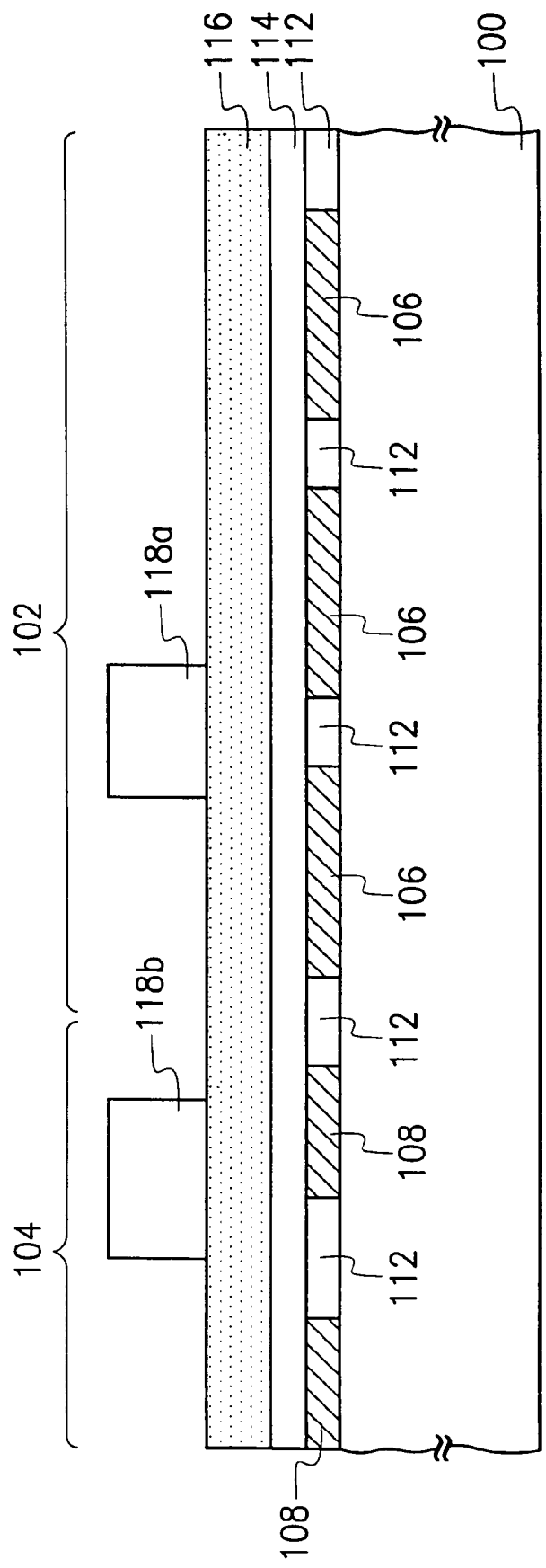

A first protective layer etching process is then conducted to define the positions of the pad spacers. As shown in FIG. 1D, by means of photolithography, the oxide layer 118 is defined, followed by an etching of the oxide layer 118 while using the silicon nitride layer 116 as an etch stop. The defined oxide layer 118a, 118b become portions of the subsequently formed pad spacers. The oxide layers 118a, 118b of the pad spacers are formed in the pixel cell area 102 and the peripheral circuit area 104, respectively.

Figure 1E:
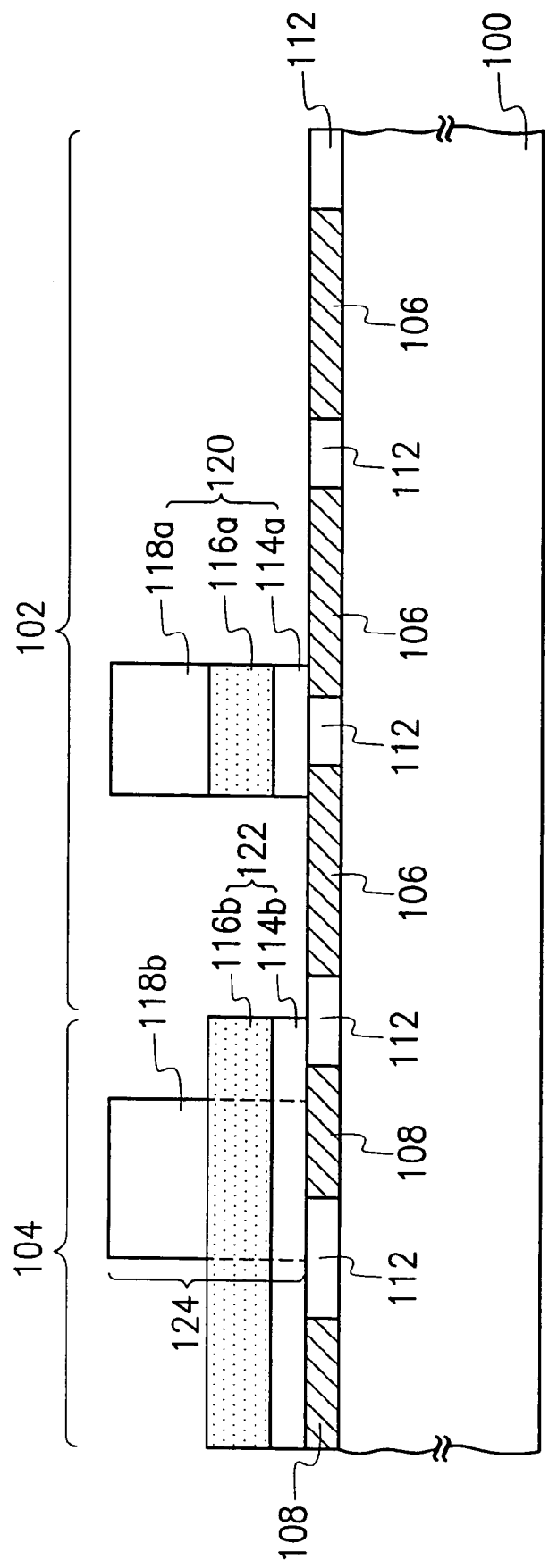

Thereafter, a second protective layer etching process is conducted to define the positions of the protective layer in the peripheral circuit area 104 and the pad spacers. Referring to FIG. 1E, the positions for the protective layer 122 in the peripheral circuit area 104 and the pad spacers 118b and 120 are formed simply by defining the silicon nitride layer 116 and the oxide layer 114 using the photolithography technique. The pixel cell area 102 mandates a protective layer with a high transparency. The combination of the silicon nitride layer 116 and the oxide layer 114, however, does not have a high light transmittance, for example, under a visible light range. The exposed silicon nitride layer 116 and the oxide layer 114 are thus removed in the etching process using the pixel cells 106 as an etch stop. A majority of the pixel cells 106 are then exposed. The pad spacer 120 in the pixel cell area 102 is also defined in this etching process using the previously defined oxide layer 118a as a mask. On the other hand, the peripheral circuit area 104 must be covered with a protective layer to prevent from being scratched and moisture penetration. The silicon nitride layer 116b and the oxide layer 114b in the peripheral circuit area 104 are retained as the protective layer 122 for the peripheral circuit area 104. The formation of the protective layer 122 for the peripheral circuit area 104 is completed concurrently in the second protective layer etching process. Furthermore, the peripheral circuit area 104 also requires the formation of a pad spacer. As a result, the peripheral circuit area 104 retains a portion of the oxide layer 118b as a pad spacer during the definition of the oxide layer 118.

The pad spacer 120 of the pixel cell area 102 is formed with the oxide layer 118a, the silicon nitride layer 116a and the oxide layer 114a. The pad spacer of the peripheral circuit area 104 is formed with the oxide layer 118b and the underlying protective layer 122. The area occupied by the oxide layer 118a in the pixel cell area 102 cannot be too big, for example, approximately 4 microns×4 microns, because a pad spacer 120 that occupies an overly large surface area affects the reflectivity of the pixel cells and the light blocking effect. Furthermore, the pad spacer 120 in the pixel cell area 102 is preferred to form above the insulation material 112, which is the intersection of the pixel cells 106. As a result, the arrangement and the dimension of the pixel cells 106 in the pixel cell area 102 determine the size of the pad spacer 120.

Because the pad spacers 120, 118b are formed scattering in the pixel cell area 102 and the peripheral circuit area 104, of the entire device. These pad spacers 120, 118b can provide support for the glass plate and the device wafer, and to prevent stress from being induced during the packaging process, wherein the stress would lead to the occurrence of the Newton's ring while filling the liquid crystal. The thickness of the filled liquid crystal is thus more uniform. Furthermore, the pad spacer 120 including the oxide layer 118a/silicon nitride layer 116a/oxide layer 114a is higher than the protective layer 122 to facilitate the filling of the liquid crystal and to determine the thickness of the liquid crystal. The thickness of the oxide layer 118a can vary according to the required thickness of the liquid crystal or the type of products.

Figure 1F:
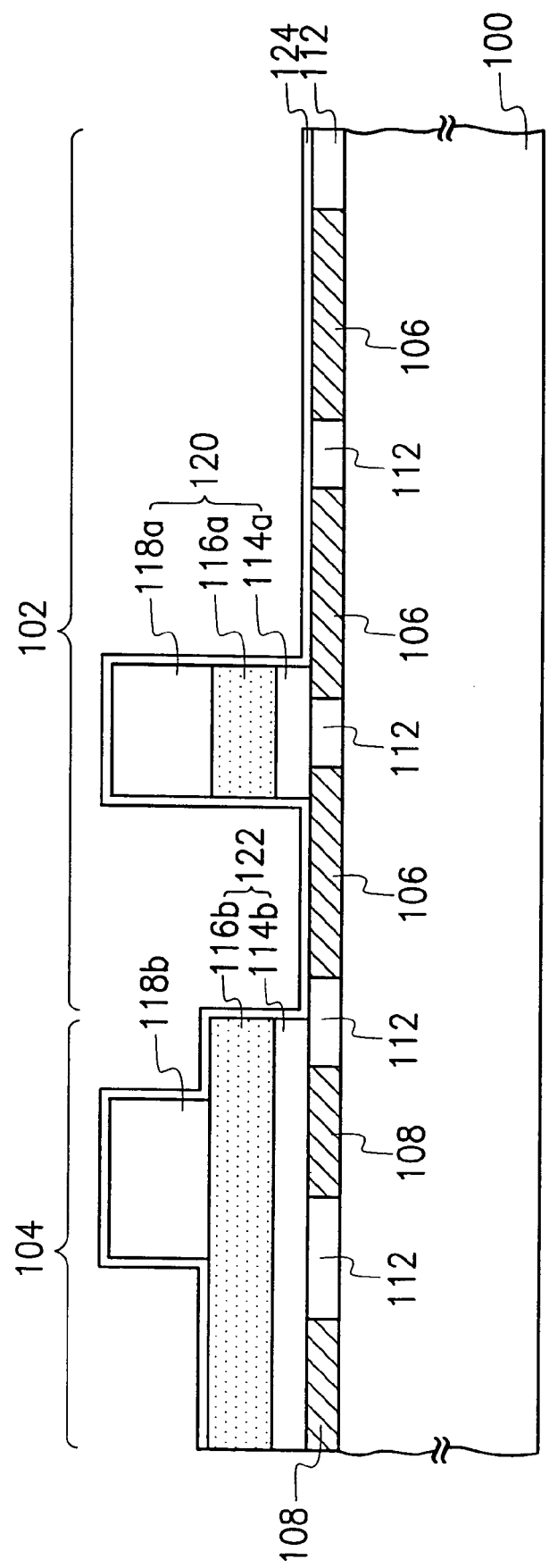

A protective layer 124 with a high transparency is further formed on the substrate 100 as shown in FIG. 1F. The transparency of the protective layer 124 is high enough for light to transmit through the protective layer 124 to reach the cell pixels 106 and to reflect back. The protective layer 124, for example, is a thin oxide layer or a combination of the silicon nitride layer/oxide layer. The protective layer 124 covers at least the pixel cells 106 in the pixel cell area 102 and to protect the pixel cells 106. The protective layer 124 can also cover other areas in the substrate 100. The thin oxide layer is, for example, a chemical vapor deposited tetra-ethyl-ortho-silicate (TEOS) layer of approximately 500 Å thick.

Since the transparency of the thin oxide layer 124 is approximately 85%, covering the pixel cells 106 with the thin oxide layer 124 does not seriously affect the reflectivity of light of the pixel cells 106. The thin oxide layer 124 can also provide an appropriate protection for the pixel cells 106.

The present invention provides a multiple etching steps in forming the multi-layer of thin films in order to accommodate the different requirements for the protective layers in a reflective micro-LCD. For example, the fabrication of a silicon nitride/oxide material is to protect the peripheral circuit area from moisture and from being scratched. For the pixel cell area, which mandates a high reflectivity, an oxide material is formed as the protective layer. Furthermore, to facilitate the filling of the liquid crystal, the height of the pad spacers formed are higher. The pad spacers are formed with a structure of oxide material/nitride material/oxide material, wherein the order of the thin films and their thickness can vary accordingly.

The present invention provides a fabrication method for a protective layer for the peripheral circuit area to prevent moisture penetration and scratch, and a protective layer with a high transparency for the pixel cell area. As a result, different device areas having different demands for protective layer are accommodated. In addition, during the fabrication process according to the embodiment of the present invention, the formation of the protective layer provides the pad spacers in the peripheral circuit area and in the pixel cell area. The pad spacers are scattered over the wafer device to lower the stress effects during the packaging process and to allow an uniform filling of the liquid crystal.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A fabrication method for a multi-layered thin film protective layer, which is applicable to a substrate comprising a first device area and a second device area, the method comprising the steps of:
    forming a first protective layer on the first device area, wherein the first protective layer prevents the first device area from moisture and scratch;
    forming a plurality of material structures on the first protective layer, the material structures and the underlying first protective layer together formed as first pad spacers;
    forming a plurality of upper oxide material/silicon nitride/bottom oxide material structures on the second device area as second pad spacers in the second device area, wherein the second pad spacers are higher than the first protective layer; and
    forming a second protective layer for at least covering the second device area, wherein a transparency of the second protective layer is higher than transparency of the first protective layer under a visible light range.

2. The fabrication method for a multi-layered thin film protective layer according to claim 1, further including:
    forming sequentially a first oxide layer, a silicon nitride layer and a second oxide layer on the substrate;
    patterning the second oxide layer to form the material structures and an upper oxide material of the upper oxide material/silicon nitride/bottom oxide material structures;
    patterning the silicon nitride layer and the first oxide layer to form a silicon nitride/oxide material structure as the first protective layer in the first device area and to form a bottom oxide material and a silicon nitride layer of the upper oxidematerial/silicon nitride/bottom oxide material structures; and
    forming a third oxide layer on the substrate as the second protective layer.

3. The fabrication method for a multi-layered thin film protective layer according to claim 2, wherein the transparency of the second protective layer is approximately 85%.

4. The fabrication method for a multi-layered thin film protective layer according to claim 2, wherein the third oxide layer is approximately 500 Å thick.

5. The fabrication method for a multi-layered thin film protective layer according to claim 2, wherein the third oxide layer includes tetra-ethyl-ortho-silicate.

6. The fabrication for a multi-layered thin film protective layer according to claim 2, wherein the first oxide layer is about 1000 angstroms thick.

7. The fabrication for a multi-layered thin film protective layer according to claim 2, wherein the silicon nitride layer is about 4000 angstroms thick.

8. The fabrication for a multi-layered thin film protective layer according to claim 2, wherein the second oxide is about 10000 angstroms thick.

9. A fabrication method for a multi-layered thin film protective layer, which is applicable to a substrate comprising a first device area and a second device area, the method comprising the steps of:
    forming a first protective layer on the first device area, wherein the first protective layer prevents the first device area from moisture and scratch;
    forming a pluxality of material structures on the first protective layer, the material structures and the underlying first protective layer together formed as first pad spacers;
    forming a plurality of multi-layered material structures on the second device area as second pad spacers in the second device area, wherein the second pad spacers are higher than the first protective layer, and
    forming a second protective layer at least covering the second device area, wherein a transmittance of the second protective layer is higher than a transmittance of the first protective layer.

10. The fabrication method for a multi-layered thin film protective layer according to claim 9, further including:
    forming sequentially a first material layer, a second material layer and a third material layer on the substrate;
    patterning the third material layer to form the material structures and an upper layer of the multi-layered material structures;
    patterning the second material layer and the first material layer to form the first protective layer in the first device area and to form a bottom layer and a center layer of the multi-layered material structures in the second device area; and
    forming a fourth material layer covering at least the second device area as the second protective layer.

11. The fabrication method for a multi-layered thin film protective layer according to claim 9, wherein the second protective layer is thinner than the upper layer, the center layer or the bottom layer of the multi-layered material structures.

12. The fabrication method for a multi-layered thin film protective layer according to claim 9, wherein the first protective layer at least comprises an oxide layer and a silicon nitride layer.

13. The fabrication method for a multi-layered thin film protective layer according to claim 9, wherein the second protective layer comprises an oxide layer.

14. The fabrication method for a multi-layered thin film protective layer according to claim 1, wherein the first protective layer, the material structures and the upper oxide material/silicon nitride/bottom oxide material structures are formed simultaneously.

15. The fabrication method for a multi-layered thin film protective layer according to claim 14, wherein a plurality of steps for forming the first protective layer, the material structures and the upper oxide material/silicon nitride/bottom oxide material structures comprises:

forming a bottom oxide layer, a silicon nitride layer and a upper oxide layer on the first device area and the second device area sequentially;

patterning the upper oxide layer to form the material structures on the first device area and to form the upper oxide material of the upper oxide material/silicon nitride/bottom oxide material structures on the second device area; and patterning the silicon nitride layer and the bottom oxide layer to form the first protective layer on the first device area and to form the silicon nitride/bottom oxide material of the upper oxide material/silicon nitride/bottom oxide material structures on the second device area.

16. The fabrication method for a multi-layered thin film protective layer according to claim 1, wherein the first device area is a peripheral circuit area of a liquid crystal display device, and the second device area is a pixel cell area of the liquid crystal display device.

17. The fabrication method for a multi-layered thin film protective layer according to claim 16, wherein a thickness of the second protective layer is thinner than a thickness of the first protective layer, the material structures, or each of the upper oxide material, each of the silicon nitride or each of the bottom oxide material of the upper oxide material/silicon nitride/bottom oxide material structures.

18. The fabrication method for a multi-layered thin film protective layer according to claim 9, wherein the multi-layered material structure and the second protective layer are formed simultaneously.

19. The fabrication method for a multi-layered thin film protective layer according to claim 9, wherein the first device area is a peripheral circuit area of a liquid crystal display device, and the second device area is a pixel cell area of the liquid crystal display device.

20. The fabrication method for a multi-layered thin film protective layer according to claim 19, wherein a thickness of the second protective layer is thinner than a thickness of the first protective layer, each of the material structures or each of the multi-layered material structures.

* * * * *